United States Patent
Strittmatter et al.

(10) Patent No.: US 9,523,616 B2
(45) Date of Patent: Dec. 20, 2016

(54) INPUT DETECTING APPARATUS, AND ASSOCIATED METHOD, FOR ELECTRONIC DEVICE

(71) Applicant: BlackBerry Limited, Waterloo (CA)

(72) Inventors: Patrick Clement Strittmatter, Frisco, TX (US); Marc Edward Holbein, Kitchener (CA); Angela Dawn Usiski, Kitchener (CA); Rene Pierre Marchand, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 304 days.

(21) Appl. No.: 13/926,019

(22) Filed: Jun. 25, 2013

(65) Prior Publication Data

US 2013/0276550 A1    Oct. 24, 2013

Related U.S. Application Data

(63) Continuation of application No. 13/025,829, filed on Feb. 11, 2011, now Pat. No. 9,035,871.

(51) Int. Cl.
- *G01L 1/16* (2006.01)
- *G01L 1/00* (2006.01)
- *G06F 3/041* (2006.01)

(52) U.S. Cl.
CPC .............. *G01L 1/005* (2013.01); *G06F 3/0414* (2013.01); *G06F 3/0416* (2013.01)

(58) Field of Classification Search
CPC ....... G06F 3/0414; G06F 3/0416; G01L 1/005
USPC ...................... 73/862.68, 862.046; 177/210 R
See application file for complete search history.

(56) References Cited

U.S. PATENT DOCUMENTS

| | | | |
|---|---|---|---|
| 4,600,067 A * | 7/1986 | Artigue et al. | 177/211 |
| 4,666,006 A * | 5/1987 | Wernimont | 177/211 |
| 5,440,237 A | 8/1995 | Brown et al. | 324/601 |
| 6,879,318 B1 * | 4/2005 | Chan et al. | 345/173 |
| 7,119,287 B2 * | 10/2006 | Kroll et al. | 177/132 |
| 7,669,486 B2 * | 3/2010 | Simons | 73/862.636 |
| 2002/0145588 A1 | 10/2002 | McCahon et al. | 345/156 |
| 2009/0278798 A1 | 11/2009 | Kim et al. | 345/158 |
| 2010/0270089 A1 | 10/2010 | Kyung et al. | 178/18.04 |

OTHER PUBLICATIONS

Final Office Action dated Jan. 31, 2014 for U.S. Appl. No. 13/025,829.

* cited by examiner

*Primary Examiner* — Max Noori
(74) *Attorney, Agent, or Firm* — Jon Gibbons; Fleit Gibbons Gutman Bongini and Bianco P.L.

(57) ABSTRACT

An apparatus, and an associated method, forms a user interface permitting input of input instructions to an electronic device. Input commands are evidence by tactile input forces applied to a force receiving surface. Force sensing elements are positioned to sense indications of the tactile input force. The force sensing element is caused to exhibit a selected input parameter value through application of a selected force thereto by application of a tightening torque to a fastener positioned in proximity to the force sensing element.

20 Claims, 4 Drawing Sheets

INPUT DETECTING APPARATUS, AND ASSOCIATED METHOD, FOR ELECTRONIC DEVICE

The present disclosure relates generally to a manner by which to detect input commands at an electronic device, such as a portable wireless device. More particularly, the present disclosure relates to an apparatus, and an associated method, that detects tactile input commands at a force-sensitive element, such as a force-sensing resistor (FSR) positioned to receive indications of the tactile input commands.

Tightening of a fastener positioned in proximity to the force-sensitive element causes the fastener to exhibit a clamp load that imparts forces to the force-sensitive element. The imparted, forces cause the force-sensitive element to exhibit an initial parameter. Controlled tightening of the fastener causes the initial parameter of the force-sensitive element to be of a desired value.

BACKGROUND

Portable electronic devices, such as wireless devices, personal digital assistance, multimedia players and recorders, and various other devices are used by many. While sometimes, such devices are single-function devices, technological advancements have increasingly permitted the devices to provide multiple functionalities. Technological advancements have also permitted the development and deployment of devices that provide new functionalities, previously unavailable or too costly for wide-scale usage. Electronic devices, whether single-function or multi-function devices, also are available that provide the new functionalities.

For instance, wireless devices used in cellular, and analogous, radio communication systems are used by many. Early-generation devices provided voice communication services with only limited data communication capabilities. But, successor-generation devices provide for increasingly data-intensive communication Patent services in which large amounts of data are communicated pursuant to performance of a data function. New functionalities sometimes provided to wireless devices generate data that is communicated during operation of the wireless devices. For instance, if the wireless device includes a camera functionality, data representative of, or related to, a recorded image, can be communicated elsewhere.

A wireless device, as well as other types of electronic devices, typically includes a user interface to provide a user of the device with output information in human-perceptible form, and, also, to permit the user of the device to input input information and commands to the device. Significant design efforts are sometimes made to provide user interfaces that are intuitive and are convenient for a user to enter the input information and commands.

Force-sensitive elements, such as force-sensing resistors, are sometimes considered for use in user interfaces. A force-sensitive element exhibits a characteristic or parameter that is dependent upon a force that is applied to the element. A force-sensing resistor (FSR), for instance, exhibits a resistance value that is dependent upon the amount of force applied to a surface of the resistor. A force-sensing resistor is typically formed of a conductive polymer that exhibits a resistance that is dependent, in a predictable manner, upon the amount of force applied to a resistor surface.

DETAILED DESCRIPTION

Figure 1:
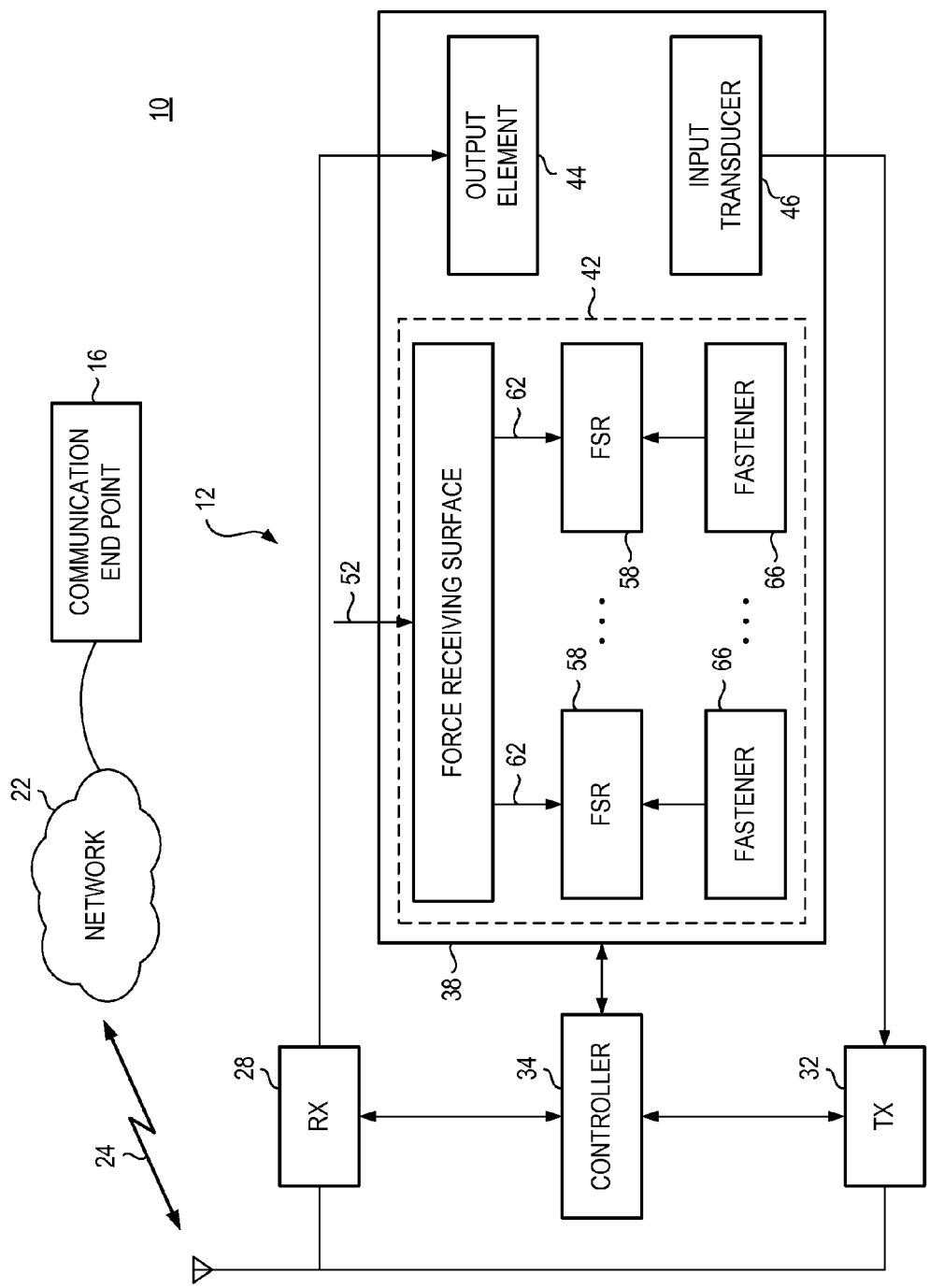
FIG. 1 illustrates a functional block diagram of a communication system that includes an implementation of the present disclosure as a portion thereof.

The present disclosure, accordingly, advantageously provides an apparatus, and an associated method, for detecting input commands at an electronic device, such as a portable wireless device.

Through operation of an implementation of the present disclosure, a manner is provided by which to detect tactile input commands at a force-sensitive element, such as at a force-sensing resistor, positioned to receive indications of the tactile input commands.

In one aspect of the present disclosure, tightening of a fastener positioned in proximity to the force-sensitive element causes the fastener to exhibit a clamp load that imparts forces to the force-sensitive element. The imparted, forces cause the force-sensitive element to exhibit an initial parameter. Through appropriate selection of the tightening torque that is applied to the fastener, the forces imparted to the force-sensitive element are correspondingly controlled. And, through appropriate application of the tightening torque, the force-sensitive element is caused to exhibit a selected common, initial parameter.

In another aspect of the present disclosure, a force-sensitive element is utilized to sense indications of tactile input forces applied to an input of a user interface. The force sensing element comprises, for instance, a force-sensing resistor that exhibits a resistance that is dependent upon the magnitude of a force incident on a surface thereof. The force is, e.g., indicative of a tactile input force forming an input command.

In another aspect of the present disclosure, a fastener is positioned in proximity to the forces-sensitive element. The fastener comprises, for instance, a threaded fastener that engages with a housing part of the electronic device. Rotational, i.e., tightening, torques applied to the fastener caused the fastener to exhibit a clamp load. And, by positioning of the fastener in proximity to the force-sensitive element, the clamp load exhibited by the fastener imparts forces upon the force-sensitive element.

In another aspect of the present disclosure, the clamp load caused to be exhibited by the fastener is selected such that the force imparted to the force-sensitive element causes the force sensing element to exhibit a selected parameter value. The imparted force is, for instance, when applied to a force sensing resistor, applied in a manner to cause the force sensing resistor to exhibit a selected level of resistance.

In another aspect of the present disclosure, the fastener is configured in line with the force-sensitive element. The clamp load exhibited by the fastener as the result of tightening torques applied thereto imparts a force to the force-sensitive element positioned in line therewith.

In another aspect of the present disclosure, the fastener is positioned in proximity to the force-sensitive element but offset therefrom. A plate member is positioned to engage with both the fastener and the force-sensitive element. The clamp load exhibited by the fastener responsive to a fastening torque applied thereto is imparted to the force-sensitive element by way of the plate member. The amount of torque applied to the fastener, the clamp load caused thereby to be exhibited by the fastener, and the force imparted to the force-sensitive element is selected to cause the force sensing element to exhibit a selected parameter value.

In another aspect of the present disclosure, a plurality of force-sensitive elements are positioned beneath a force receiving surface that is configured to receive a tactile input force. Each of the force-sensitive elements is positioned thereby to have forces applied thereto that are indicative of the tactile input forces applied for supply to the force receiving surface. The force-sensitive elements are of characteristics that cause the force-sensitive elements all to change characteristics in a corresponding manner upon application of the indications of the tactile input forces applied to the force-sensitive elements.

In another aspect of the present disclosure, assembly operations by which to assemble a user interface module, or entire electronic device containing the user interface module, are performed. During the assembly, fasteners are positioned in proximity to the force-sensitive element. Tightening forces are applied to the fasteners, thereby to cause the fasteners to exhibit a clamp force and to impart forces to associated force sensitive elements. The tightening forces are applied to each of the fasteners to cause the associated force-sensitive elements to exhibit selected initial parameter values. In one implementation, feedback is provided related to the parameter value, and a tightening torque is provided until the force-sensitive element exhibits the desired initial parameter value. In another implementation, the tightening torque is provided to ensure that the initial parameter value of the force-sensitive element is within a desired range of parameter values.

Thereby, compensation is made for manufacturing variations of the force-sensitive sensing elements. The tightening torques provided, e.g., by a torque application tool, are amendable for an assembly line-like procedure. Problems conventionally resulting from the force-sensitive elements exhibiting different initial parameter values are overcome as compensation is made through the application of the tightening torques.

In these and other aspects, therefore, an input apparatus, and an associated method, is provided for an electronic device. A force receiving surface is configured to receive a tactile input force applied thereon. A plurality of force-sensitive elements are configured to sense indications of the tactile input force applied to the force receiving surface. And, a plurality of sensing-element fasteners are provided. Each sensing-element fastener is configured to exhibit a clamp load such that each force-sensitive element, prior to application of the tactile input force, exhibits a common initial parameter.

Turning first, therefore, to FIG. 1, a communication system, shown generally at 10, provides for radio communications. The communication system, in the exemplary implementation shown in FIG. 1, comprises a cellular radio communication system. The communication system 10 is, more generally, representative of any of various types of radio, and other, communication systems, and the following description of FIG. 1 with respect to the exemplary implementation of the communication system as a cellular radio communication system is by way of example only.

The communication system 10 includes communication devices, here represented by a wireless device 12 and a communication endpoint 16. The communication endpoint 16 is representative of any of various communication devices capable either of being a communication source or communication destination. Communications are effectuated during operation of the communication system between communication devices, such as the device 12 and endpoint 16.

The communication system includes a network part 22, here representative of a plurality of spaced-apart radio base stations positioned throughout a geographic area that is encompassed by the communication system as well as other structure and entities that provide for the communication of information during operation of the communication system. Radio channels 24, represented by the arrow in FIG. 1, are defined by a radio air interface extending between the wireless device 12 and the network part 22. Information sourced at the wireless device 12 is sent by way of channels 24 defined upon the radio air interface, the network 22, and delivered to the communication endpoint 16. And, information originated at the communication endpoint 16 is sent, by way of the network 22, the channels 24 defined upon the radio air interface and delivered to the wireless device 12.

The wireless device 12 includes transceiver circuitry, here represented by a receive part (Rx) 28 and a transmit part (Tx) 32. The receive part detects signals communicated to the wireless device, and the transmit part transmits information sourced at the wireless device.

The wireless device here also includes a controller 34 that provides various controls, and other, functions. The controller controls operation of the transceiver circuitry of the wireless device and also other functionalities of the wireless device when the wireless device forms a multi-functional device.

The wireless device further includes a user interface 38 including apparatus 42 of an implementation of the present disclosure. The user interface provides for presentation of received information at an output element 44 of the user interface. The output element includes, e.g., a visual display element and an audio display element. The output element also provides for presentation in human perceptible form of various control and other operational aspects of the device 12. And, the user interface 38 here also includes an audio transducer, such as a microphone, 46 that transduces audio signals into electrical form for application to the transmit part of the transceiver circuitry.

The apparatus 42 also provides for the input of information, such as input of commands that control operation of the device 12. The commands are entered, e.g., by a user of the device to select any of various operational aspects of the device. When selection is made, a tactile input force, indicated by the arrow 52, is applied to a force receiving circuit 54. Force-sensing resistors 58 are positioned beneath (as-shown) the force receiving surface 54. Forces 52 directed upon the force receiving surface are imparted, here indicated by the arrows 62, to surfaces of the force-sensing resistor 58. The application of the imparted forces alters parameter values, here, the resistances, of the force-sensing resistors. The resistors, in turn, are coupled to other circuit portions, such as the controller 34, of the device 12. As the electrical characteristics of the force-sensing resistors 58 vary depending upon the forces applied thereto, the application of the forces is detectable by detecting the resistance, or other electrical characteristic, of the force-sensing resistor.

Thereby, the input command, evidenced by the application of the tactile input force 52 and imparted, by way of the force receiving surface 54 to the force-sensing resistors, is detectable by detecting the resistance of the resistors.

As mentioned previously, force-sensing resistors, and other force-sensitive elements, often times exhibit varying properties, although manufactured in identical manners. Existing compensation techniques have generally been difficult to carry out in mass-production assembly. The apparatus 42, in contrast, provides for calibration of the force-sensing resistors to cause the resistors to exhibit desired initial parameters, i.e., resistances. The compensation thereby permits each force-sensing resistor to exhibit a desired, e.g., substantially equal or consistent, initial parameter value.

The apparatus 42 includes fasteners 66 that are positioned in proximity to the force-sensitive elements 58. The fasteners, here threaded fasteners, are caused to exhibit a clamp load, such as through application of tightening torques to the respective fasteners. By positioning the fasteners in proximity to the force-sensitive elements 58, parts of the clamp loads exhibited by the fasteners 66 are imparted to the force-sensitive elements. Through appropriate application of the tightening torques to the fasteners 66, or otherwise causing the fasteners to exhibit the clamp loads, the force is imparted to the force-sensitive elements adjust the characteristics thereof. Through appropriate selection of the clamp load caused to be exhibited by the fasteners, the initial parameter value, e.g., resistance value, of each of the force-sensitive elements is caused to be a desired value. The fasteners 66 are, in one implementation, positioned within the device 12, accessible during assembly of the device 12. In another implementation, the fasteners 66 are externally accessible, comprising, for instance, the fasteners that fasten together the housing parts of the device.

The use of threaded fasteners in the exemplary implementation is amendable for assembly in a mass-production procedure. During assembly, an automated screw driver or other tightening torque provider, is positioned to apply the tightening torques to the fastener 66 so that the fasteners exhibit a clamp load that is imparted to associated fasteners. The elements 58, in one implementation, are connected in a feedback configuration so that indications of the characteristic parameter value of the force-sensitive element is provided to the automated screw driver, or other appropriate device, thereby to permit the amount of torque to be applied to the fasteners to cause the elements 58 to exhibit the desired initial operating parameter values. In one implementation, the fasteners 66 comprise the fasteners that also fasten together housing parts of the device 12 together.

Figure 2:
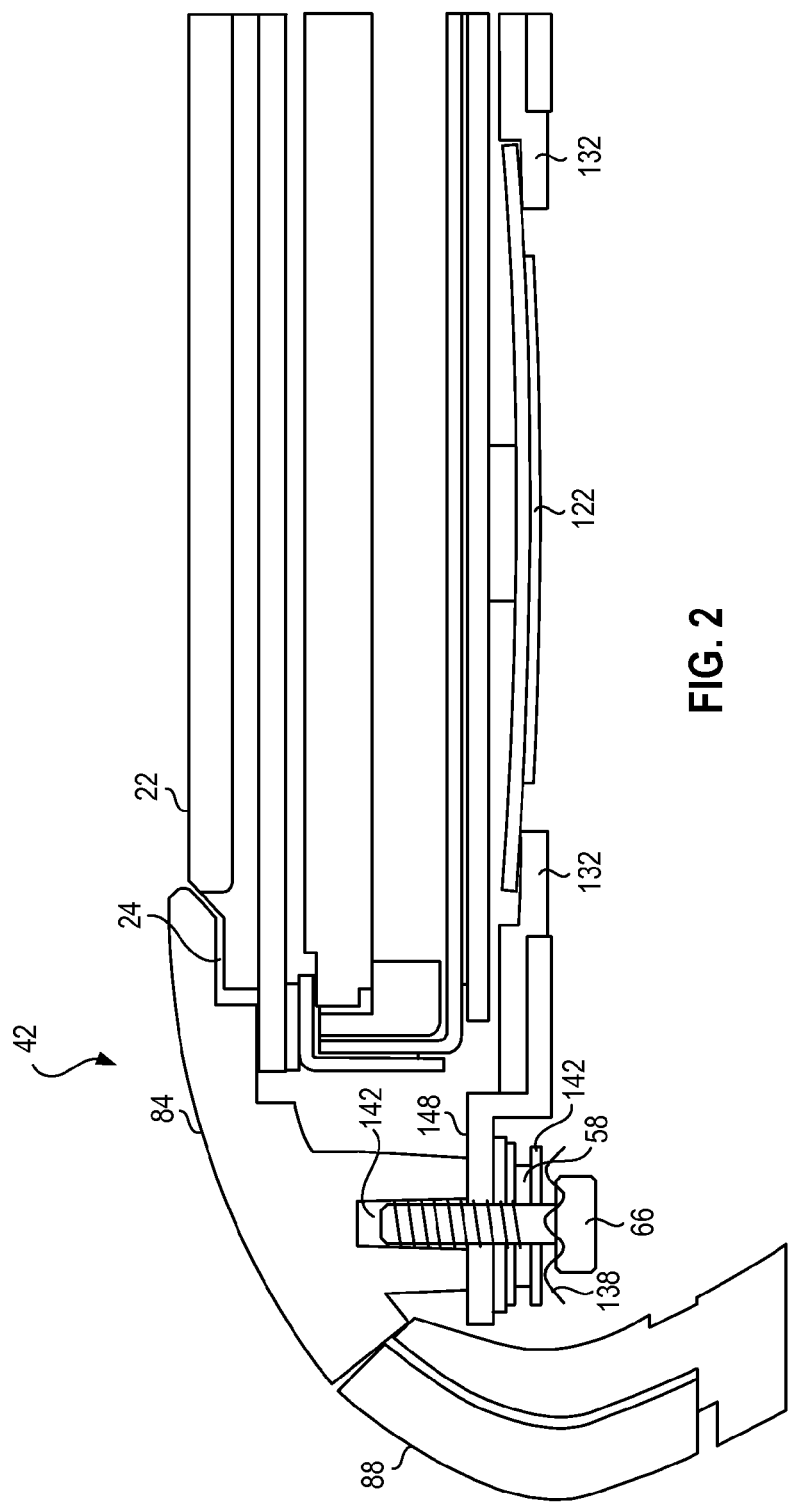
FIG. 2 illustrates an exemplary implementation of the present disclosure.

FIG. 2 illustrates a representation of the apparatus 42 of an implementation of the present disclosure positioned at an electronic-device housing, such as the wireless device 12 shown in FIG. 1. The housing is here formed of a rear housing 82, a front cover 84, and side piece 88. The force receiving surface 54 is configured such that the face surface thereof is positioned at a front-cover aperture defined by the front cover 84, thereby to permit a user to apply a force forming the input force at the face of the force receiving surface. The force receiving surface 54 is affixed to a support plate 96 of a support assembly that is positioned beneath the support plate 96 and of which the support plate 96 forms a portion. A flat or leaf spring 122 is positioned beneath the support assembly and maintained in position thereat by opposing side-support plates 132. The spring is biased to provide a spring force that causes the support assembly, and the force receiving surface 54 supported thereon, to abut against the front cover 84 when in a nominal state. The nominal state is a state in which no tactile input forces are applied to the force receiving surface greater than the counter-active spring bias force of the spring 122.

The fastener 66, forming a threaded fastener, engages with a threaded receiving hole 142 formed in the front housing 84. A force-sensing resistor 58 is positioned in-line with the fastener 66, positioned between the fastener head and the front cover. In the exemplary implementation, in addition to positioning of the force-sensing resistor 58 in-line with the fastener 66, a spring washer 138, a flat washer 142 and a flex piece 144 are also positioned in-line with the fastener. And, additionally, a generally, horizontally-extending S-configured plate number 148 includes a side portion that is positioned in-line with the fastener and a second side portion positioned beneath the support assembly and force receiving surface 54.

Application of the tightening torque to the fastener 66 imparts forces to the sensing resistor positioned directly in-line with the fastener. Through appropriate selection of the amount of tightening torque applied to the fastener, the force-sensing resistor 58 is caused to exhibit a desired, initial resistance, or other parameter, value. Once set with the initial parameter value, the force-sensing resistor is used in operation of a user interface incorporating the apparatus 42. A user electing to enter an input by application of a tactile input force at the force receiving surface 54 is imparted to the force-receiving resistor 58 by way of the plate member 148, and by way of the support assembly that supports the force receiving surface. When the magnitude of the tactile input force applied to the force receiving surface 54 exceeds the opposing, spring bias force exerted by the spring member 122, the force receiving surface, and the support assembly, are downwardly translated to abut against, and apply force to, the side support plates 132, and, in turn, to the support plate 148 and the force-sensing resistor 58. When the tactile input force is no longer applied, the force receiving surface returns to the nominal state position in, e.g., a clicking movement caused by the spring bias force.

In the exemplary implementation, a plurality of fastener and force-sensing resistor pairs are utilized, e.g., proximate to four corners of the force receiving surface 54. In the exemplary implementation, a plurality of fastener and force-sensing resistor pairs are utilized, e.g., proximate to four corners of the force receiving surface 54.

Figure 3:
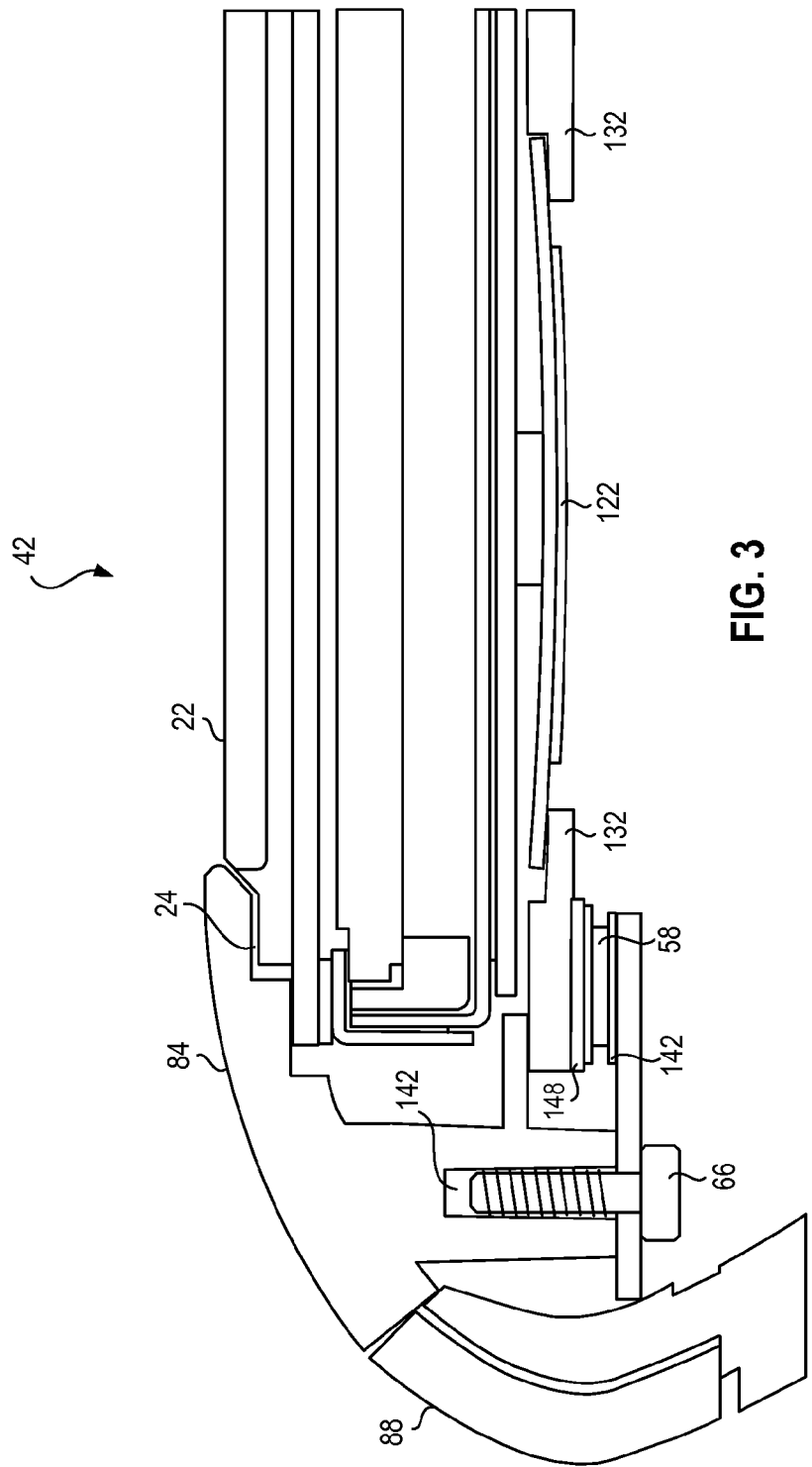
FIG. 3 illustrates an alternate implementation of the present disclosure.

FIG. 3 illustrates an alternate implementation of the apparatus 42. The apparatus 42 is again shown to be positioned at a housing of an electronic device comprising a rear housing 82, front cover 84, and side piece 88. And, the force receiving surface 54 is supported in a nominal state position, abutting against the front cover by bias spring forces that are imparted to the support assembly that supports the force receiving surface.

In this implementation, the fastener 58 is not positioned directly in-line with the force-sensing resistor 58. Rather, the force-sensing resistor and fastener are spaced apart by one another and interconnected by a support plate 152. A portion of the support plate 152 is positioned in line with the fastener and a second portion of the support plate is positioned in line with the force-sensing resistor. Tightening torques applied to the fastener 66 are imparted to the force-sensing resistor by way of the plate 132. Again, through appropriate selection of the amount of tightening torque applied to the fastener a desired initial resistance, or other parameter, value of the force sensing resistor is obtained. Again, in the exemplary implementation, a plurality of fastener and force-sensing resistor pairs are utilized, such as four fastener and force-sensing resistor pairs positioned in each of four corners beneath the force receiving surface 54.

Figure 4:
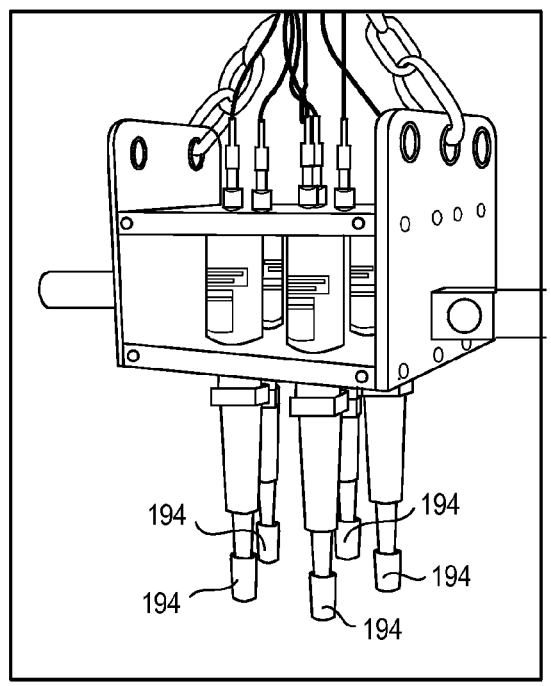
FIG. 4 illustrates a representation of further apparatus of an implementation of the present disclosure.

FIG. 4 illustrates a representation of an exemplary tool 192 of an implementation of the present disclosure. The tool 192 provides the tightening torques that tighten fasteners 66 shown to form parts of the apparatus 42 shown in FIGS. 1-3. Here, the tool 192 comprises a four-head torque driver having four pneumatically-driven driver heads 194 configured to engage with fasteners 66 (shown in FIGS. 1-3). An additional connection is provided that interfaces with the apparatus 42 to be provided with resistance, or other parameter, values of the force sensing resistors to which forces are imparted responsive to tightening of the fasteners. The screws are turned to tighten the screws using the driver heads 194. And, tightening is stopped when the feedback provided to the interface indicates that the desired parameter values are obtained at each of the respective force sensing resistors. Tightening torques are provided independently by each of the driver heads 194, each positioned in a separate feedback loop. In another implementation, tightening torques are applied without feedback to cause the force sensing resistors to exhibit parameter values within a selected range of parameter values.

Figure 5:
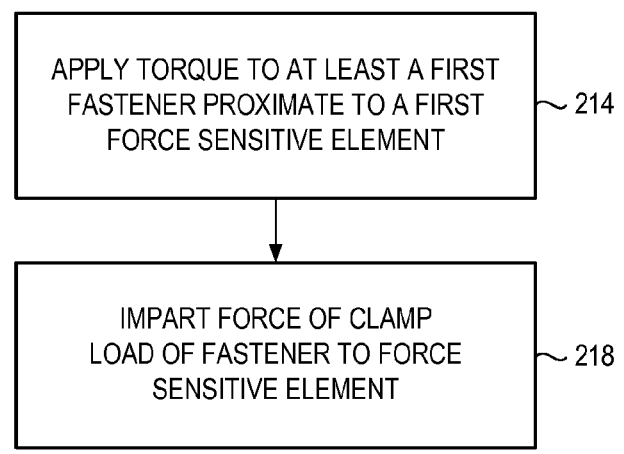
FIG. 5 illustrates a method flow diagram representative of the method of operation of an implementation of the present disclosure.

FIG. 5 illustrates a method, shown generally at 212, representative of the method of operation of an implementation of the present disclosure. The method facilitates detection of a tactile input at an input element of an electronic device.

First, and as indicated by the block 214, a torque is applied to at least a first fastener that is positioned proximate to a corresponding at least first force sensing element. The applied force causes the first fastener to exhibit a selected clamp load. Then, and as indicated by the block 218, the clamp load exhibited by the fastener is imparted to a corresponding force sensing element to cause the force sensing element to exhibit a selected initial parameter value.

Thereby, manufacturing, and other, variations are compensated for through the application of the imparted clamp load to cause the force sensing element to exhibit the selected initial parameter value.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus comprising:
  a first force sensing element for producing a first electrical characteristic in response to a first applied force;
  a second force sensing element for producing a second electrical characteristic in response to a second applied force;
  a first fastener for producing a first clamping force for mechanically coupling the first force sensing element to a housing and for calibrating the first electrical characteristic to a first initial parameter, the first clamping force being a component of the first applied force and the first electrical characteristic including the first initial parameter responsive to the first clamping force;
  a second fastener for producing a second clamping force for mechanically coupling the second force sensing element to the housing and for calibrating the second electrical characteristic to a second initial parameter, the second clamping force being a component of the second applied force and the second electrical characteristic including the second initial parameter responsive to the second clamping force; and
  a force receiving surface coupled to the first force sensing element and the second force sensing element and configured to receive a variable tactile force and impart portions of the variable tactile force to the first and second force sensing elements as additional components of the first and second applied forces.

2. The apparatus according to claim 1 wherein the first initial parameter and the second initial parameter are substantially equal.

3. The apparatus according to claim 1 wherein adjusting the first clamping force with the first fastener calibrates the first initial parameter and adjusting the second clamping force with the second fastener calibrates the second initial parameter.

4. The apparatus according to claim 3 wherein the first and second initial parameters are calibrated to be substantially equal.

5. The apparatus according to claim 1 wherein the first fastener is a treaded fastener that engages with a first threaded receiver in the housing and the first initial parameter is calibrated in response a first tightening torque for the first fastener.

6. The apparatus according to claim 4 wherein the second fastener is a treaded fastener that engages with a second threaded receiver in the housing and the second initial parameter is calibrated in response to a second tightening torque applied to the second fastener.

7. The apparatus according to claim 1 wherein the first and second electrical characteristics have a first difference when the first and second force sensing elements are coupled to the housing and the variable tactile force is substantially zero and the first and second electrical characteristics have a second difference when the first and second force sensing elements are decoupled from the housing and the first and second applied forces are substantially zero, further wherein the first difference is less than the second difference.

8. The apparatus of claim 7 wherein the first and second clamping forces are adjusted to calibrate the first difference to be less than the second difference.

9. The apparatus according to claim 1 wherein the first and second force sensing elements comprise pressure-to-electrical transducers.

10. The apparatus according to claim 9 wherein the first and second force sensing elements comprise force sensing resistors.

11. The apparatus according to claim 1 further comprising:
  a third force sensing element for producing a third electrical characteristic in response to a third applied force;
  a fourth force sensing element for producing a fourth electrical characteristic in response to a fourth applied force;
  a third fastener for producing a third clamping force for mechanically coupling the third force sensing element to the housing and for calibrating the third electrical characteristic to a third initial parameter, the third clamping force being a component of the third applied force and the third electrical characteristic including the third initial parameter responsive to the third clamping force;
  a fourth fastener for producing a fourth clamping force for mechanically coupling the fourth force sensing element to the housing and for calibrating the fourth electrical characteristic to a fourth initial parameter, the fourth clamping force being a component of the fourth applied force and the fourth electrical characteristic including the fourth initial parameter responsive to the second clamping force; and the force receiving surface further coupled to the third force sensing element and the fourth force sensing element and configured to further impart portions of the variable tactile force to the third and fourth force sensing elements as additional components of the third and fourth applied forces.

12. The apparatus according to claim 11 wherein the first, second, third and fourth electrical characteristics have a first maximum difference when the first, second, third and fourth force sensing elements are coupled to the housing and the variable tactile force is substantially zero and the first, second, third and fourth electrical characteristics have a second maximum difference when the first, second, third and fourth force sensing elements are decoupled from the housing and the first, second, third and fourth applied forces are substantially zero, further wherein the first maximum difference is less than the second maximum difference.

13. The apparatus of claim 12 wherein the first, second, third and fourth clamping forces are adjusted to calibrate the first maximum difference to be less than the second maximum difference.

14. A method for facilitating detection of a tactile input at an input element of an electronic device, said method comprising:

applying a first torque to a first fastener of a plurality of fasteners, the first fastener positioned proximate to a first force sensing element of a plurality of force sensing elements to cause the first fastener to exhibit a first clamp load to mechanically couple the first force sensing element to a housing; and calibrating the first torque for imparting the first clamp load to the first force sensing element to cause the first force sensing element to exhibit a first electrical characteristic having a first initial parameter.

15. The method according to claim 14 further comprising:

applying a second torque to a second fastener of the plurality of fasteners, the second fastener positioned proximate to a second force sensing element of the plurality of force sensing elements to cause the second fastener to exhibit a second clamp load to mechanically couple the second force sensing element to the housing; and calibrating the second torque for imparting the second clamp load to the second force sensing element to cause the second force sensing element to exhibit a second electrical characteristic having a second initial parameter, wherein the first and second electrical characteristics have a first difference prior to applying the first and the second torques and the first and the second electrical characteristics have a second difference less than the first difference after calibrating the first and the second torques.

16. The method of claim 15 further comprising detecting the tactile input imparted to both the first and second force sensing elements.

17. The method according to claim 15 further comprising:

applying a third torque to a third fastener of the plurality of fasteners, the third fastener positioned proximate to a third force sensing element of the plurality of force sensing elements to cause the third fastener to exhibit a third clamp load to mechanically couple the third force sensing element to the housing; and calibrating the third torque for imparting the third clamp load to the third force sensing element to cause the third force sensing element to exhibit a third initial parameter, wherein the first and third electrical characteristics have a third difference prior to applying the first and the third torques and the first and the third electrical characteristics have a fourth difference less than the third difference after calibrating the first and the third torques.

18. The method of claim 17 further comprising detecting the tactile input imparted to all of the first, second and third force sensing elements.

19. An input apparatus for an electronic device, the input apparatus comprising:

a force receiving surface configured to receive a tactile input force applied thereon;

a plurality of force sensing elements configured to sense indications of the tactile input force applied on the force receiving surface and imparted to each of the plurality of sensing elements; and a plurality of sensing element fasteners, each sensing element fastener both mechanically coupling each of the plurality of force sensing elements to a housing and exhibiting a calibrated clamp load such that each force sensing element, prior to application of the tactile input force, exhibits a common initial parameter.

20. The input apparatus of claim 19 wherein said plurality of force sensing elements comprise four corner-positioned force sensing elements positioned beneath the force receiving surface.

* * * * *